United States Patent [19]
Yuda et al.

[11] Patent Number: 5,257,298
[45] Date of Patent: Oct. 26, 1993

[54] NUCLEAR FUEL PELLETS HAVING AN ALUMINOSILICATE DEPOSITION PHASE

[75] Inventors: Ryoichi Yuda, Mito; Kenichi Ito, Katsuta; Hiroshi Masuda, Mito, all of Japan

[73] Assignee: Nippon Nuclear Fuel Development Co., Ltd., Ibaraki, Japan

[21] Appl. No.: 845,490

[22] Filed: Mar. 4, 1992

[30] Foreign Application Priority Data

Mar. 4, 1991 [JP] Japan ................... 3-037267
Nov. 11, 1991 [JP] Japan ................... 3-294413

[51] Int. Cl.$^5$ ............................................. G21C 3/62
[52] U.S. Cl. ........................... 376/421; 252/638; 264/0.5
[58] Field of Search ............... 376/261, 421, 422, 901; 976/DIG. 96, DIG. 95, DIG. 93; 264/0.5; 252/638, 636; 423/261

[56] References Cited

U.S. PATENT DOCUMENTS

| | | | |
|---|---|---|---|
| 4,749,529 | 6/1988 | Halldahl | 264/0.5 |
| 4,869,866 | 9/1989 | Lay et al. | 376/421 |
| 4,869,867 | 9/1989 | Lay et al. | 376/421 |

FOREIGN PATENT DOCUMENTS

| | | |
|---|---|---|
| 0316623 | 5/1989 | European Pat. Off. . |
| 0317772 | 5/1989 | European Pat. Off. . |
| 2516690 | 5/1983 | France . |
| 1-193691 | 8/1989 | Japan . |
| 2-242195 | 9/1990 | Japan . |

OTHER PUBLICATIONS

Patent Abstracts of Japan, vol. 14, No. 565, Dec. 17, 1990, and JP-A-22-042-195, Sep. 26, 1990, K. Tokai et al., "Manufacture of Nuclear Fuel Pellet".
World Patents Index, No. 91-227-295, and JP-A-3-146-895, "Nuclear Fuel Prodn.–Involves Adding Alumina and Silica to Mixt. to of Uranium and/or Plutonium Di: Oxide(s) and Gadolinia", Jun. 1991.
World Patent Index, No. 92-039-031, and JP-A-3-287-096, "Nuclear Fuel Pellet Prodn. for Fast Breeder Reactor-by Compression Moulding Uranium Di: Oxide, Sintering and Heating Silicate Vapour Contg. Hydrogen", Dec. 1991.

*Primary Examiner*—Daniel D. Wasil
*Attorney, Agent, or Firm*—Oblon, Spivak, McClelland, Maier & Neustadt

[57] ABSTRACT

This invention provides nuclear fuel pellets including fission substance of $UO_2$ or $UO_2$ having $Gd_2O_3$ added thereto, the pellets comprising a satisfactory solid-solution state (homogeneous state), large grain diameters, and a second precipitation phase deposited in grain boundaries, and still having a sufficiently high density. This invention also provides a method of manufacturing the above-described nuclear fuel pellets.

The nuclear fuel pellets of this invention comprise $UO_2$ or $(U, Gd) O_2$ grains and an aluminosilicate precipitation phase, the precipitation phase being a glass state or a crystalline state, the grains having an average grain diameter of about 20 $\mu$m through about 60 $\mu$m, the aluminosilicate precipitation phase having a composition including $SiO_2$ of about 40 wt % through about 80 wt % and $Al_2O_3$ of the residual on average, the amount of the alumina and silica being about 10 ppm through about 500 ppm with respect to the total amount of the nuclear fuel pellets, the pellets having porosity of 5 vol % at a maximum.

10 Claims, 2 Drawing Sheets

NUCLEAR FUEL PELLETS HAVING AN ALUMINOSILICATE DEPOSITION PHASE

BACKGROUND OF THE INVENTION

1. Field of the Invention

This invention relates to nuclear fuel pellets including $UO_2$ and $UO_2$-$Gd_2O_3$, and more particularly to nuclear fuel pellets having a satisfactory solid-solution state, greater grain diameters and a second phase precipitated in grain boundaries. This invention also relates to a method of manufacturing the above-described nuclear fuel pellets.

2. Description of the Prior Art

As for nuclear fuel to be loaded into a light water reactor or a fast breeder reactor, intactness of fuel has been confirmed at a high burnup level ever experienced in a reactor. However, at present, extension of burnup to still higher levels has been planned. This plan inevitably involves the following disadvantages. Specifically, so-called bubble swelling occurs due to fission gas deposited in grain boundaries, i.e., an apparent volume of pellets increases due to bubbles produced in pellets because of gaseous fission products. Thus, PCI (pellet-cladding interaction), which is a mechanical interaction between pellets and a cladding, increases. Further, an inner pressure of a fuel rod increases because of fission gas release from fuel pellets. These phenomena may cause intactness of fuel to be deteriorated.

To avoid these disadvantages, the following techniques have been attempted. Specifically, a fission gas release fraction (a ratio of the released to the produced of fission gas) is suppressed by increasing diameters of pellets grains. This is based on that a fission gas release from pellets is rate-controlled by diffusion of fission gas in pellet grains. However, when the diameters of pellet grains are increased, a creep rate of the pellets is decreased. This provides an adverse effect on PCI.

To increase a creep rate of pellets there have been disclosed two technique (Japanese Patent Applications No. 1-193691 and No. 2-242195) in which a sintering agent consisting of aluminum oxide and silicon oxide is added to uranium dioxide powder so that a second soft phase can be precititated in the grain boundaries of the pellets. In these techniques, the total amounts of the sintering agents to be added are about 0.1 wt % through about 0.8 wt %, and about 0.05 wt % through about 0.4 wt %, respectively.

In general, it has been known that sinterability of a mixed oxide of $UO_2$ and $Gd_2O_3$ is lower than that of pure $UO_2$. Further, when sintering is performed under a given condition, a sintered density and grain diameters of the mixed oxide of $UO_2$ and $Gd_2O_3$ become smaller than those in the case of pure $UO_2$. Further, when sintering is performed in a flowing dry hydrogen, a large number of micro-cracks occur in pellets. To avoid the above-described disadvantages, in the case of $UO_2$ having $Gd_2O_3$ added thereto, sintering is generally performed in a humid hydrogen atmosphere or in a mixed gas atmosphere of carbon dioxide and carbon monoxide. Further, the sintering is performed at a relatively high temperature (1700° C. or higher). However, assume that sintering is performed in such atmospheres and a sintering agent, which consists of aluminum oxide and silicon oxide in the above-described conventional proportion, is added to the mixed oxide of $UO_2$ and $Gd_2O_3$. In this case, pores are generated in pellets, probably due to evaporation of silicon oxides, so that a density of pellets becomes decreased. As the pellet density becomes lower, a thermal conductivity of the pellets degrades. As a result, a fuel center temperature increases in service, so that both bubble swelling and a fission gas release rate are enhanced. This is disadvantageous to the performance of nuclear fuel pellets. Further, it has also been experimentally confirmed that grain diameters of pellets and a solid-solution state thereof can no longer be improved even when a sintering agent of 500 ppm or more is added.

SUMMARY OF THE INVENTION

Accordingly, one object of the present invention is to provide nuclear fuel pellets including fission substance, the fission substance being $UO_2$ alone or $UO_2$ having $Gd_2O_3$ added thereto, the pellets comprising a satisfactory solid-solution state (homogeneous state), large grain diameters, and a second phase precipitated in grain boundaries, and still having a sufficiently high density.

Another object of the present invention is to provide a method of manufacturing the above-described nuclear fuel pellets.

Briefly, in accordance with one aspect of the present invention, there are provided nuclear fuel pellets including fission substance, the fission substance being $UO_2$ alone or $UO_2$ having $Gd_2O_3$ added thereto. The nuclear fuel pellets comprises $UO_2$ or $(U, G) O_2$ grains and aluminosilicate deposition phases of glassy and/or crystalline state. An average diameter of the grains is in the range from about 20 μm through about 60 μm. The aluminosilicate deposition phases have a composition consisting of $SiO_2$ of 40 wt % through 80 wt % and $Al_2O_3$ of residual on average. The amount of the alumina plus silica is about 10 through 500 ppm with respect to the total weight of the nuclear fuel pellets. Further, the total volume of as-fabricated pores in the pellets is 5 vol % at a maxiumum.

In accordance with another aspect of the present invention, there is provided a method of manufacturing the above-described nuclear fuel pellets. The method comprises the steps of compacting an oxide powder of $UO_2$ or $UO_2$ having $Gd_2O_3$ added thereto, and sintering the oxide powder compacts. More specifically, the method comprises the steps of mixing a sintering agent (including the precursor thereof) consisting of $SiO_2$ of about 40 wt % through about 80 wt % and $Al_2O_3$ of the residual with the above-described oxide powder, the mixing proportion thereof being about 10 ppm through about 500 ppm with respect to the total amount of the oxide powder and the sintering agent; pressing the mixed oxide powder so as to obtain green pellets; and sintering the green pellets at a temperature in a range of about 1500° C. through 1800° C. so as to obtain sintered pellets.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
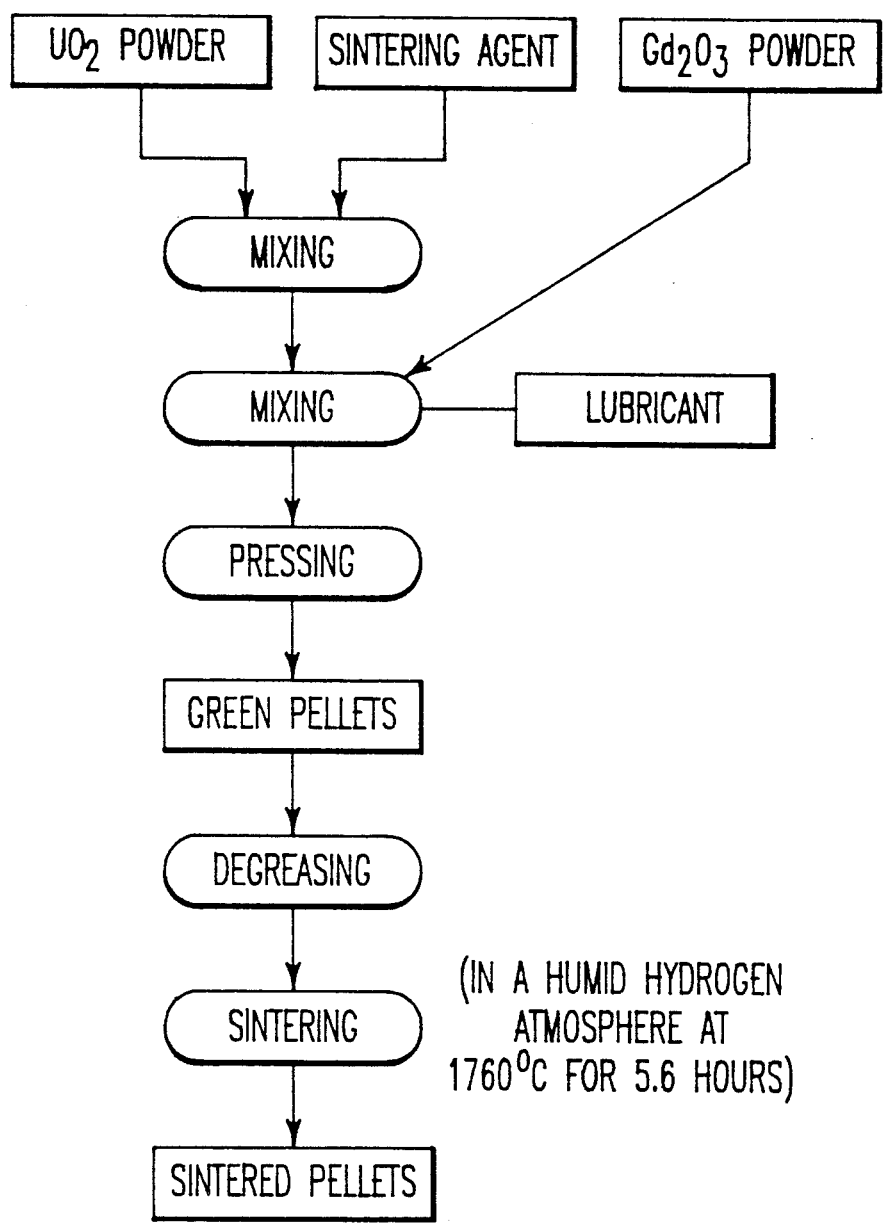
FIG. 1 is a diagram illustrating processes of one embodiment according to the present invention.

Hereinafter, manufacturing processes according to one embodiment of the present invention will be described with reference to FIG. 1.

First, a sintering agent was manufactured in the following manner. Specifically, $Al_2O_3$ of about 40 wt % and $SiO_2$ of about 60 wt % were coarsely mixed. The mixture thereof was exposed to a mixed gas flow of 8%-$H_2/N_2$, and was heated up to about 2100° C., and then melted. Thereafter, the melt was cooled, and homogeneous aluminum silicate was obtained. The thus obtained aluminum silicate was then ground. As a result, uniform powder was obtained as a sintering agent. By use of this sintering agent, nuclear fuel pellets were manufactured in accordance with processes shown in FIG. 1. Specifically, the sintering agent was added to $UO_2$ powder, and then $Gd_2O_3$ powder was mixed. Further, a lubricant (stearic acid, polyethylene glycol and the like) was added, as shown in FIG. 1. This mixture was compacted by an uniaxial press and then green pellets were obtained. The adding amount of the sintering agent was about 30 through about 500 ppm, and the adding amount of the $Gd_2O_3$ powder was about 10 wt %, both with respect to the total amount of $UO_2$, $Gd_2O_3$ and the above-described sintering agent. Next, the thus obtained green pellets were processed in a degreasing process. Thereafter, the green pellets were sintered in a humid hydrogen atmosphere at about 1760° C. for about 5.6 hours. In some cases, the lubricant-mixing process and the degreasing process may be omitted.

The sintering density and average grain diameter of the thus manufactured nuclear fuel pellets were compared with those of the nuclear fuel pellets obtained by use of the sintering agent of adding amount of 0.25 wt %. The results of comparison are as follows:

| adding amount of sintering agent | sintered density (g/cm³) | average grain diameter (μm) |
| --- | --- | --- |
| 30 ppm | 10.40 | 27.2 |
| 70 ppm | 10.34 | 25.6 |
| 130 ppm | 10.39 | 25.7 |
| 250 ppm | 10.37 | 32.7 |
| 500 ppm | 10.33 | 33.3 |
| 0.25 wt % | 10.20 | 24.7 |

As can be seen from the comparison results, the sintered densities of the pellets manufactured in accordance with this embodiment are significantly higher than that of the pellet manufactured with addition of the sintering agent by 0.25 wt %. Further, the grain diameters of the pellets of this invention are also increased.

Figure 2:
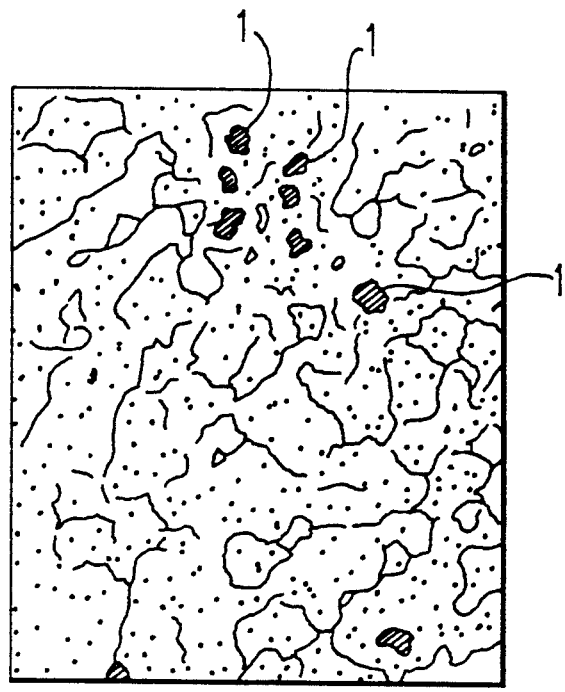
FIG. 2 is a diagram illustrating nuclear fuel pellets according to one embodiment of the present invention when observed by a microscope.
Figure 3:
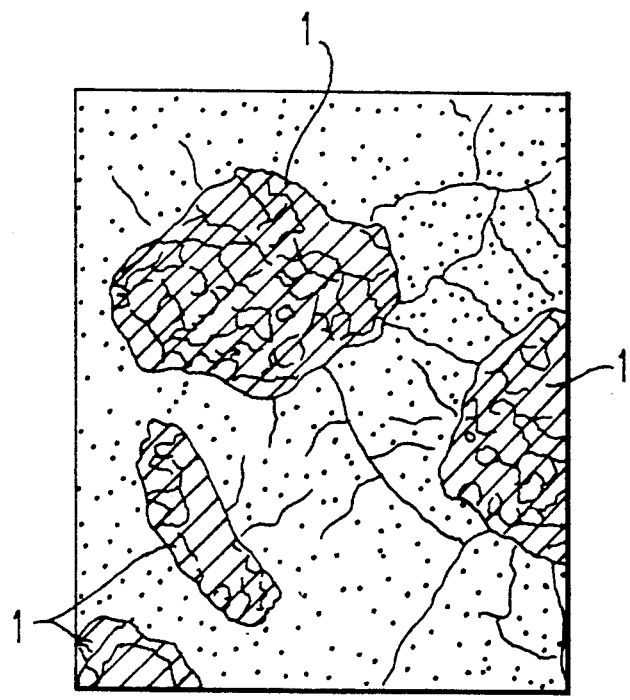
FIG. 3 is a diagram illustrating nuclear fuel pellets manufactured by use of a conventional technique in which a sintering agent is not used, when observed by a microscope.

For the sake of comparison, FIG. 2 and FIG. 3 respectively show the microstructure of each nuclear fuel pellet after polished and chemically etched, when observed by a microscope. Specifically, FIG. 2 shows a $UO_2$-10 wt % $Gd_2O_3$ nuclear fuel pellet including the sintering agent of 30 ppm according to this embodiment. FIG. 3 shows conventional a $UO_2$-10 wt % $Gd_2O_3$ without a sintering agent. As can be seen from FIG. 2 and FIG. 3, in the pellet of this embodiment (FIG. 2), the portions of free $UO_2$ phase, which are indicated by the shaded portions (blue portions in the actual microphotograph), are much smaller (2 vol % at a maximum) than those shown in FIG. 3.

In this embodiment according to the present invention, a humid hydrogen gas was used as a sintering atmosphere. However, a mixed gas of carbon monoxide and carbon dioxide may also be used as a sintering atmosphere. Further, in this embodiment, aluminum oxide and silicon oxide were mixed and melted, and then aluminum silicate was obtained as a sintering agent. However, besides this, the mere mixed powder of aluminum oxide and silicon oxide may also be used as a sintering agent. Further, the mixture of alkoxides such as aluminum isopropoxide, tetraethyl orthosilicate, etc. and precursors such as aluminum hydroxide, aluminum stearate and the like may also be used as a sintering agent.

As described above, when nuclear fuel pellets are manufactured in accordance with the manufacturing method of this invention, a series of phenomena occur in the following manner. Specifically, a sintering agent becomes a single liquid phase during the sintering, and through this liquid phase, $Gd_2O_3$ is dispersed into the entire pellets. Thus, the effective inter-diffusion distances between $UO_2$ and $Gd_2O_3$ become smaller, so that the generation of solid-solution phase is promoted. Further, a liquid phase-sintering mechanism promoters reaction between particles, so that the growth of grains is promoted. This growth of grains increases the diffusion distance between FP gas and grain boundaries. Thus, a FP gas release rate from the pellets decreases.

In the present invention, the mixing proportion of a sintering agent (consisting of aluminum oxide and silicon oxide) is determined to be about 10 ppm through about 500 ppm with respect to the total amount of nuclear fuel pellets. This is based on that the following facts have been confirmed. Specifically, the adding amount of the sintering agent must be 10 ppm at a minimum in order to improve the solid-solution state (i.e., to obtain homogeneous pellets) while a free $UO_2$ phase is maintained to be 5% at a maximum. Further, the grain-growth-promoting effect reaches a maximum when the adding amount of the sintering agent is about 250 ppm. Further, when the adding amount of the sintering agent exceeds 500 ppm, this is not only insignificant but also decreases the pellet density. Further, if the sintering agent includes $Al_2O_3$ of more than 60 wt %, the grain-growth-promoting effect decreases.

As described above, according to the present invention, the solid-solution state (i.e., homogeneous state) of nuclear fuel pellets can be improved. Further, the creep characteristics of nuclear fuel pellets can also be improved by grain boundaries softened by glassy phase in spite of large grain diameter. Therefore the nuclear fuel pellets of this invention can decrease a FP gas release rate, and can also improve the PCI resistance, whereby burnup extensin toward higher levels of the nuclear fuel can be achieved.

Obviously, numerous additional modifications and variations of the present invention are possible in light of the above teachings. It is therefore to be understood that within the scope of the appended claims, the invention may be practiced otherwise than as specifically described herein.

What is claimed is:

1. Nuclear fuel pellets including a fission substance of $UO_2$, the nuclear fuel pellets comprising $UO_2$ grains and an aluminosilicate deposition phase, the deposition phase being a glassy state, a crystalline state or a combination thereof, said grains having an average grain diameter of about 20 $\mu$m through about 60 $\mu$m, said aluminosilicate deposition phase having a composition including $SiO_2$ of about 60 wt % through about 80 wt % and $Al_2O_3$ of the residual on average, the amount of alumina plus silica being about 10 ppm through about 500 ppm with respect to the total amount of said nuclear fuel pellets, said pellets having a porosity of 5 vol % at a maximum.

2. The nuclear fuel pellets of claim 1, wherein the amount of alumina plus silica is about 10 ppm through 30 ppm with respect to the total amount of said nuclear fuel pellets.

3. The nuclear fuel pellets of claim 1, wherein the amount of alumina plus silica is about 10 ppm through 70 ppm with respect to the total amount of said nuclear fuel pellets.

4. The nuclear fuel pellets of claim 1, wherein the amount of alumina plus silica is about 10 ppm through 130 ppm with respect to the total amount of said nuclear fuel pellets.

5. The nuclear fuel pellets of claim 1, wherein the amount of alumina plus silica is about 10 ppm through about 250 ppm with respect to the total amount of said nuclear fuel pellets.

6. Nuclear fuel pellets including a fission substance of $UO_2$ having $Gd_2O_3$ added thereto, the nuclear fuel pellets comprising $(U, Gd)O_2$ grains and an aluminosilicate deposition phase, the deposition phase being a glassy state, a crystalline state or a combination thereof, said grains having an average grain diameter of about 20 $\mu$m through about 60 $\mu$m, said aluminosilicate deposition phase having a composition including $SiO_2$ of about 40 wt % through about 80 wt % and $Al_2O_3$ of the residual on average, the amount of alumina plus silica being about 10 ppm through about 500 ppm with respect to the total amount of said nuclear fuel pellets, said pellets having a porosity of 5 vol % at a maximum.

7. The nuclear fuel pellets of claim 6, wherein the amount of alumina plus silica is about 10 ppm through 30 ppm with respect to the total amount of said nuclear fuel pellets.

8. The nuclear fuel pellets of claim 6, wherein the amount of alumina plus silica is about 10 ppm through 70 ppm with respect to the total amount of said nuclear fuel pellets.

9. The nuclear fuel pellets of claim 6, wherein the amount of alumina plus silica is about 8 ppm through 130 ppm with respect to the total amount of said nuclear fuel pellets.

10. The nuclear fuel pellets of claim 6, wherein the amount of alumina plus silica is about 10 ppm through about 250 ppm with respect to the total amount of said nuclear fuel pellets.

* * * * *